United States Patent
Okano

(10) Patent No.: US 9,647,711 B2
(45) Date of Patent: May 9, 2017

(54) ELECTRONIC DEVICE

(71) Applicant: Kabushiki Kaisha Toshiba, Tokyo (JP)

(72) Inventor: Motochika Okano, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 296 days.

(21) Appl. No.: 14/460,193

(22) Filed: Aug. 14, 2014

(65) Prior Publication Data

US 2015/0305457 A1 Oct. 29, 2015

(30) Foreign Application Priority Data

Apr. 24, 2014 (JP) .................. 2014-089868

(51) Int. Cl.
*H04B 5/00* (2006.01)
*H04B 7/00* (2006.01)
*H04B 1/3827* (2015.01)

(52) U.S. Cl.
CPC ...... *H04B 1/385* (2013.01); *A45F 2200/0516* (2013.01); *H04B 2001/3861* (2013.01)

(58) Field of Classification Search
CPC .................................................... H04B 1/385
USPC .................. 455/575.1, 90.3, 575.8, 41.1
See application file for complete search history.

(56) References Cited

U.S. PATENT DOCUMENTS

| 6,888,502 B2 | 5/2005 | Beigel et al. |
| 7,251,197 B2 * | 7/2007 | Yoshida .............. H04B 1/385 368/10 |
| 8,515,505 B1 * | 8/2013 | Pattikonda .......... H04B 1/385 368/281 |

FOREIGN PATENT DOCUMENTS

| JP | 2002051138 A | 2/2002 |
| JP | 2005519557 A | 6/2005 |
| JP | 2007125104 A | 5/2007 |

* cited by examiner

*Primary Examiner* — Tilahun B Gesesse
(74) *Attorney, Agent, or Firm* — Patterson & Sheridan, LLP

(57) ABSTRACT

According to one embodiment, an electronic device includes a cover, a flexible board, a coupler, a communication module, and an output device. The cover covers at least a part of the flexible board. The coupler is on the flexible board and has flexibility. The communication module performs close proximity wireless communication by using the coupler. The output device outputs at least a part of data received by the coupler.

5 Claims, 15 Drawing Sheets

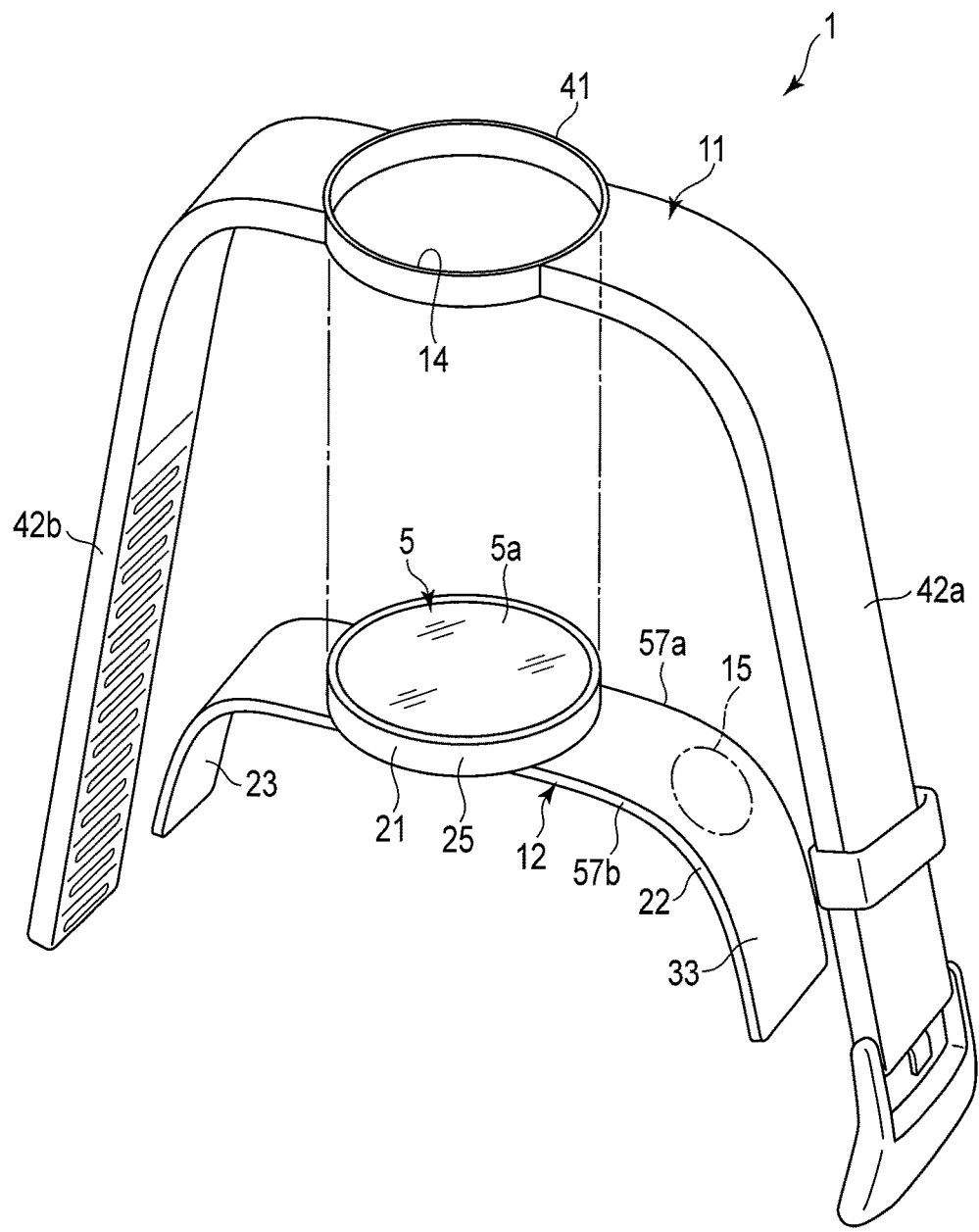
F I G. 2

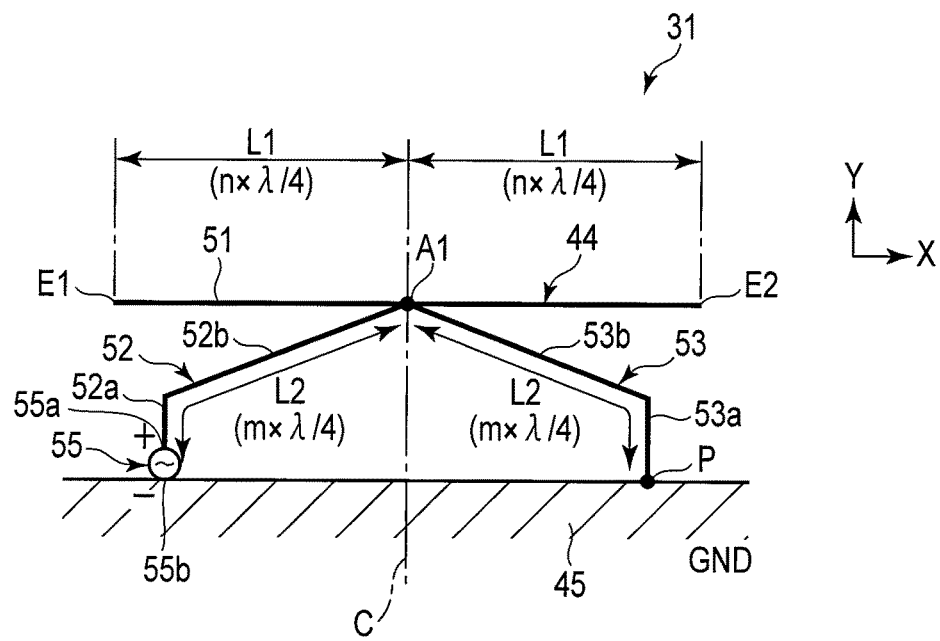
F I G. 4
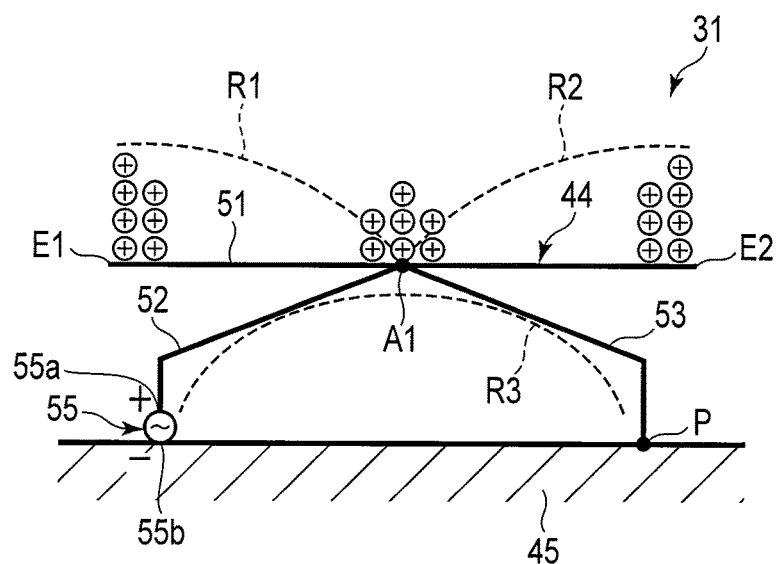
F I G. 5

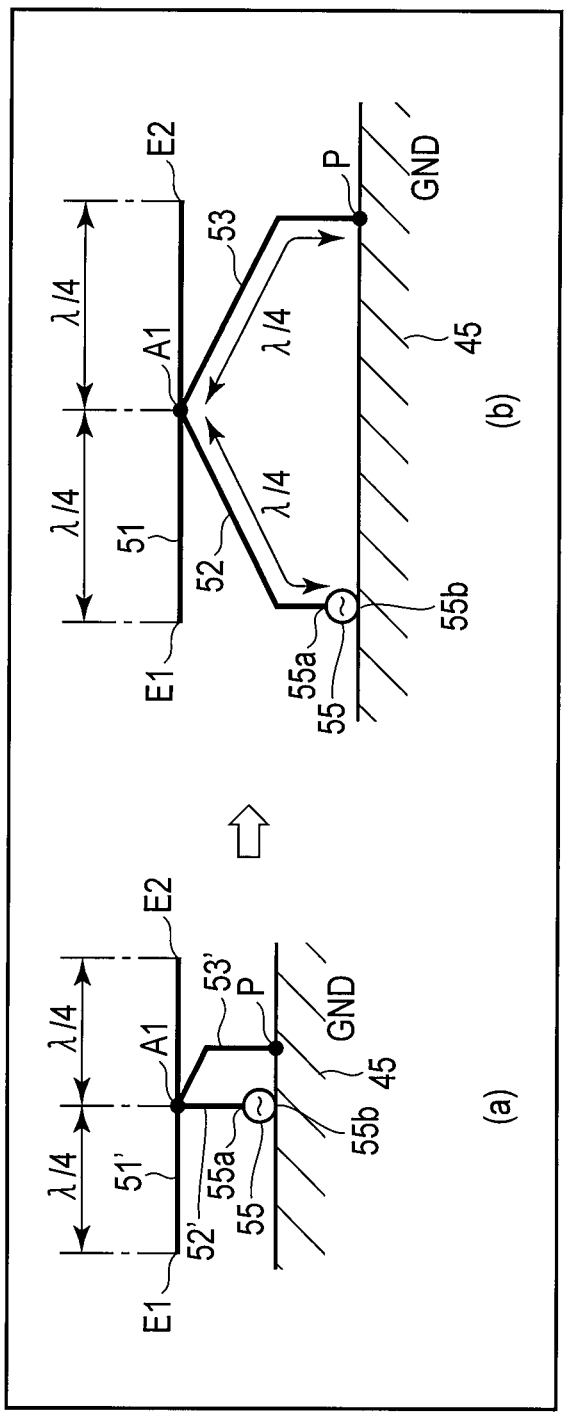
F I G. 6

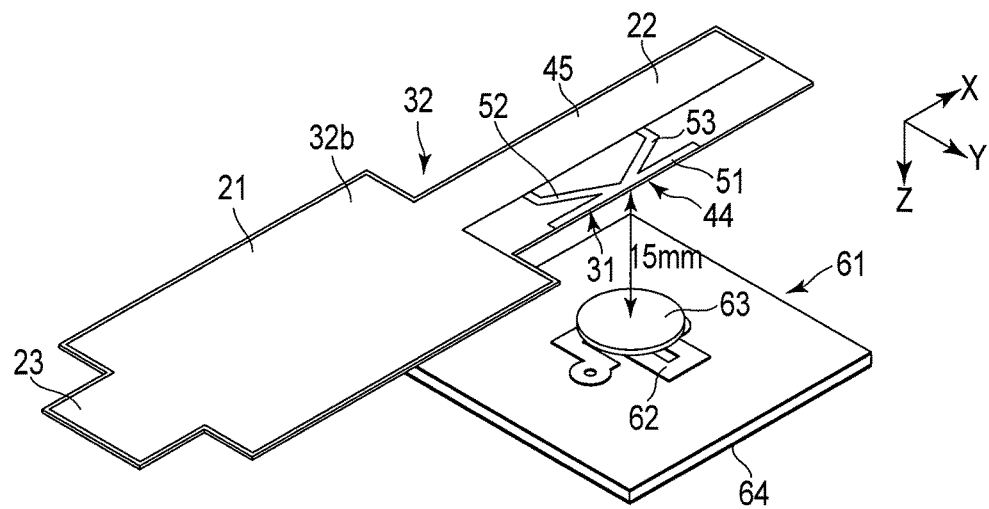
F I G. 8
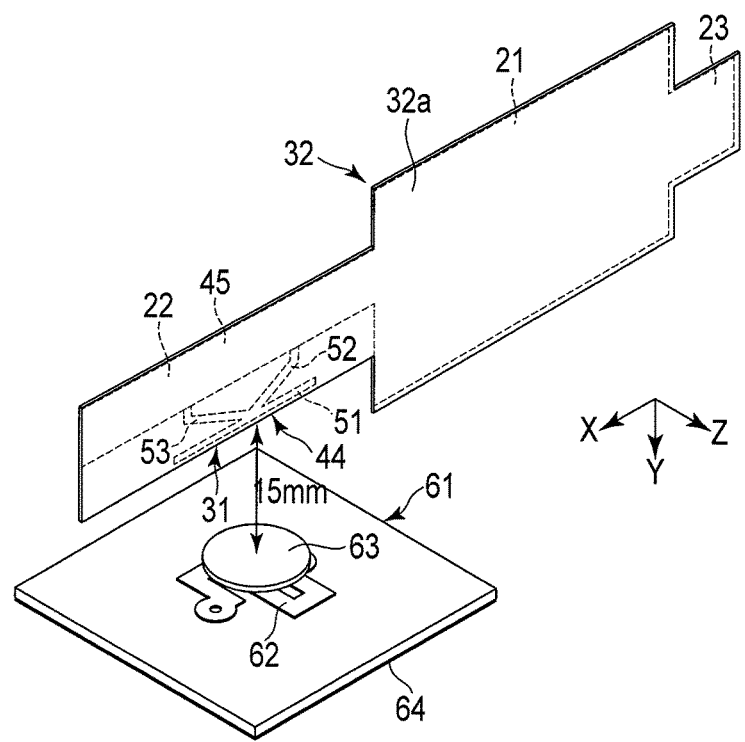
F I G. 9

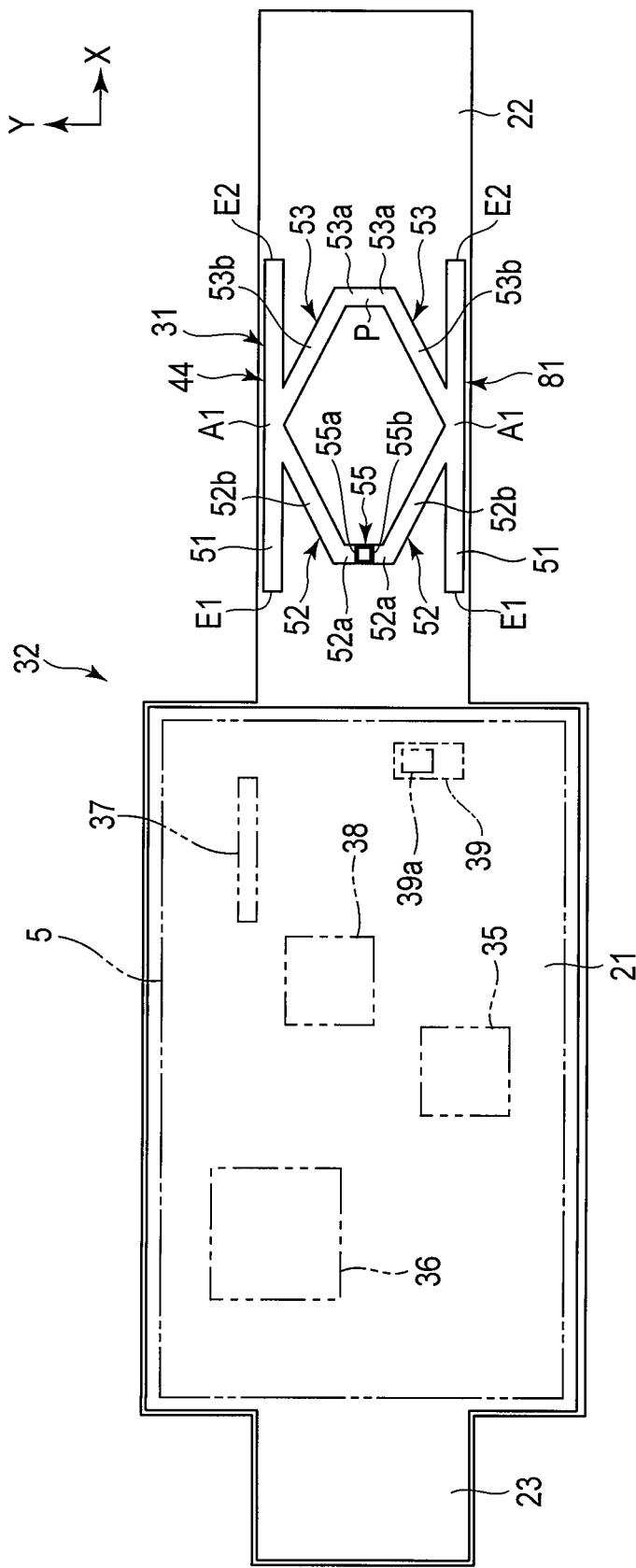
F I G. 11

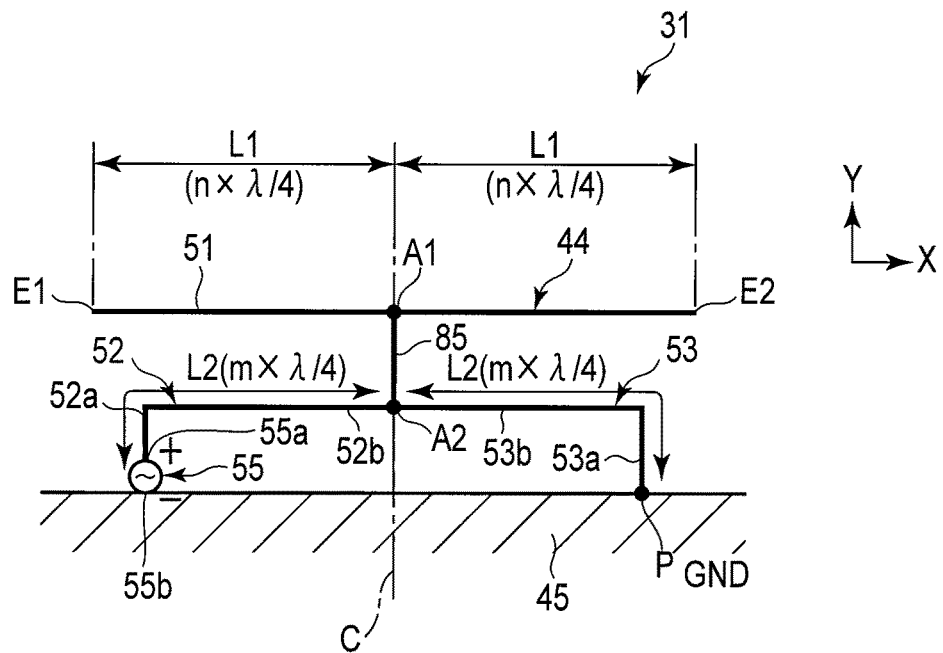
F I G. 13
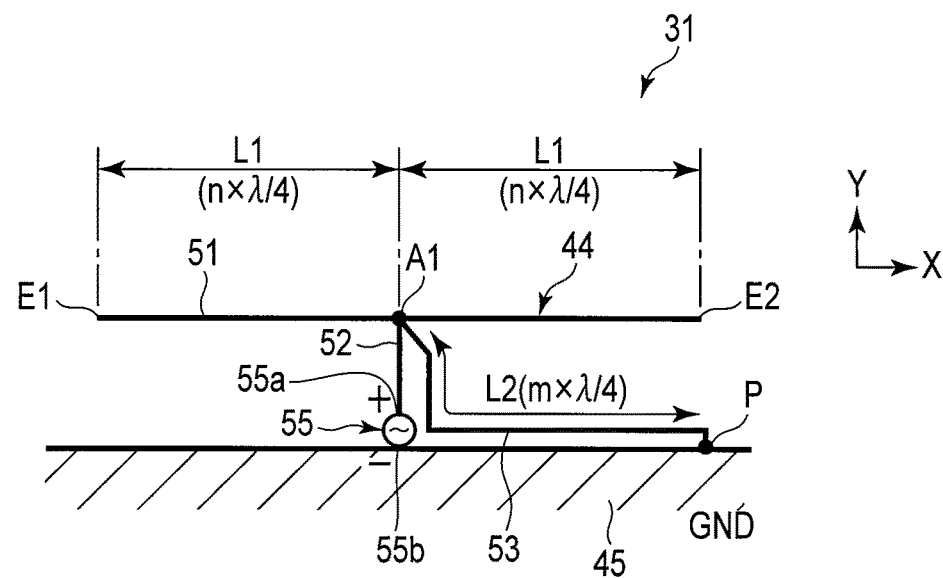
F I G. 15

ELECTRONIC DEVICE

CROSS-REFERENCE TO RELATED APPLICATIONS

This application is based upon and claims the benefit of priority from Japanese Patent Application No. 2014-089868, filed Apr. 24, 2014, the entire contents of which are incorporated herein by reference.

FIELD

Embodiments described herein relate generally to an electronic device.

BACKGROUND

There is provided an electronic device comprising a coupler for close proximity wireless communication.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary partially-exploded perspective view illustrating the electronic device shown in FIG. 1.

FIG. 4 is an exemplary schematic view illustrating a coupler shown in FIG. 1.

FIG. 5 is an exemplary schematic view illustrating a resonance of the coupler shown in FIG. 1.

FIG. 6 is an exemplary schematic view illustrating how the coupler shown in FIG. 1 works.

FIG. 8 is a view illustrating a first measurement condition of a coupler shown in FIG. 7.

FIG. 9 is a view illustrating a second measurement condition of the coupler shown in FIG. 7.

FIG. 11 is an exemplary plan view illustrating a flexible board of an electronic device according to a third embodiment.

FIG. 13 is an exemplary schematic view illustrating a coupler shown in FIG. 12.

FIG. 15 is an exemplary schematic view illustrating a coupler shown in FIG. 14.

DETAILED DESCRIPTION

Figure 1:
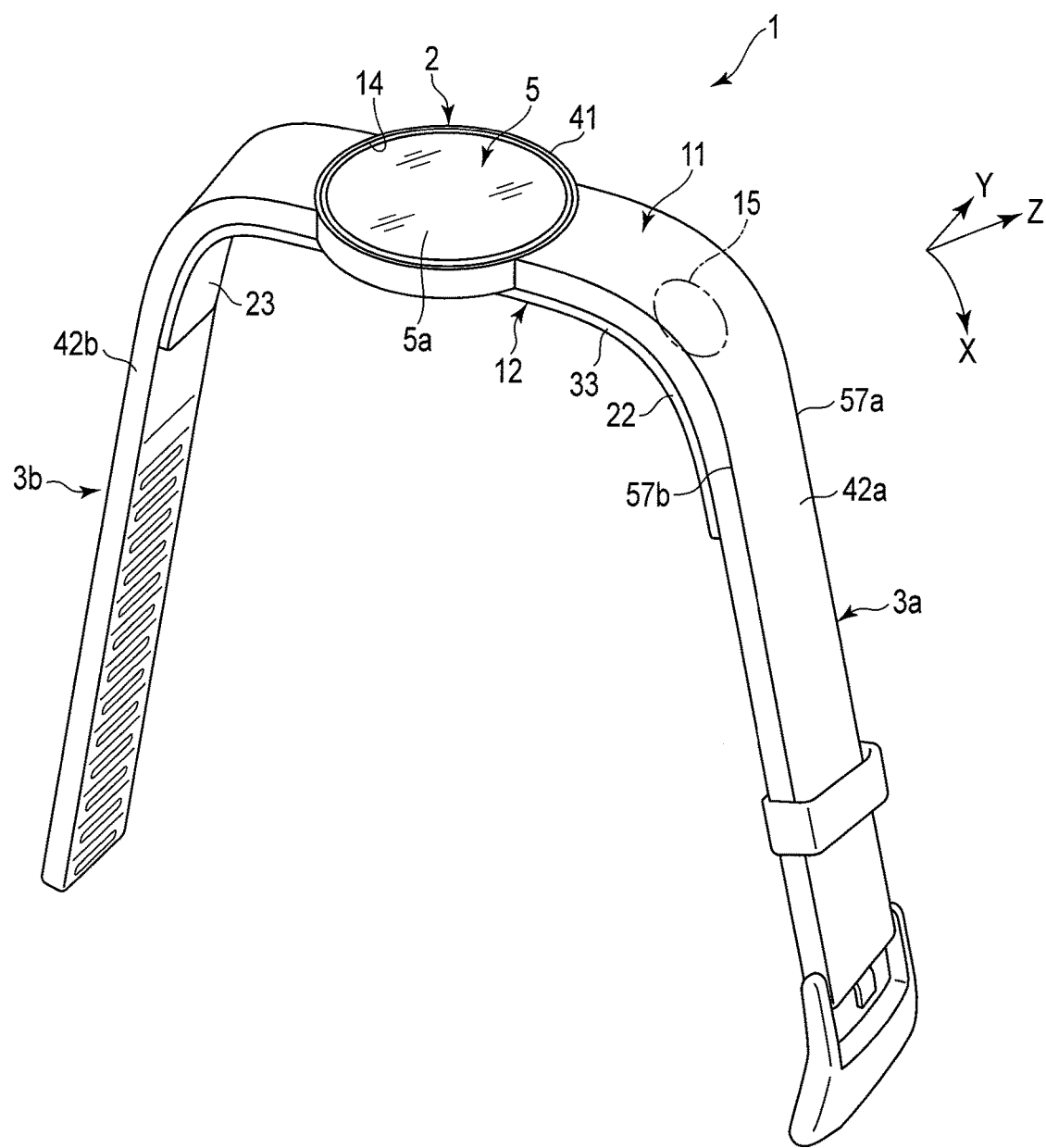
FIG. 1 is an exemplary perspective view illustrating an electronic device according to a first embodiment.

Various embodiments will be described hereinafter with reference to the accompanying drawings.

In general, according to one embodiment, an electronic device comprises a cover, a flexible board, a coupler, a communication module, and an output device. The cover covers at least a part of the flexible board. The coupler is on the flexible board and has flexibility. The communication module performs close proximity wireless communication by using the coupler. The output device outputs at least a part of data received by the coupler.

Some components are expressed by two or more terms. These terms are merely examples and these components may be expressed by another or other terms. The other components, which are not expressed by two or more terms, may be expressed by another or other terms.

The drawings are merely examples, and may differ from when the embodiments are actually realized in terms of, for example, the relationship between thickness and planar dimension and the ratio of thickness of layers. In the drawings, the relationship or ratio of dimensions may be different from figure to figure.

First Embodiment

FIGS. 1 to 6 illustrate an electronic device 1 according to the first embodiment. FIG. 1 illustrates an exterior of the electronic device 1. The electronic device 1 is a wristband mobile device, for example, and can be used when put on a user's arm. Note that an electronic device applicable to the first embodiment is not limited to this example. The structure of the first embodiment is widely applicable to various kinds of electronic devices.

As shown in FIG. 1, the electronic device 1 comprises a display unit 2 and a pair of band portions 3a and 3b. The display unit 2 comprises a display 5, which will be described below, and displays various kinds of information input or stored in the electronic device 1. The display unit 2 is positioned substantially parallel to, for example, the back of a user's hand with the electronic device 1 put on the user's arm. Although the display unit 2 of the first embodiment does not have bendability, the display unit 2 may have bendability.

The pair of band portions 3a and 3b are arranged separately at both ends of the display unit 2 and extend substantially linearly. Each of the band portions 3a and 3b has flexibility (i.e., bendability or pliability) and can be bent, for example, in a curved shape with respect to the display unit 2. The band portions 3a and 3b are bent along the outer periphery of a user's arm such that the band portions 3a and 3b are curved along the user's arm. The pair of band portions 3a and 3b have engaging portions coupled with each other, and can be coupled with each other.

FIG. 2 is a partially-exploded view illustrating the electronic device 1. The electronic device 1 comprises a cover 11 (e.g., outer cover or exterior member) and a device main unit 12. The cover 11 covers the device main unit 12 and forms the main part of the pair of band portions 3a and 3b. The cover 11 comprises a first opening 14, where the display unit 2 is exposed. The cover 11 can be selected (e.g., can be exchanged) in accordance with a user's preference, as various kinds of materials (for example, rubber, plastic, nylon and coat) are prepared.

On the other hand, the device main unit 12 is a module comprising various kinds of electronic components. The device main unit 12 comprises a first portion 21, a second portion 22 and a third portion 23. The first portion 21, which is a portion corresponding to the display unit 2, is inserted into the first opening 14 of the cover 11. The first portion 21 comprises a case 25 having rigidity and the display 5 accommodated in the case 25. The display 5 comprises a display screen 5a, which is exposed outside. The display 5 is an example of an "output device" and outputs to the display screen 5a at least a part of data received by a coupler 31 (i.e., first antenna), which will be described below.

Figure 3:
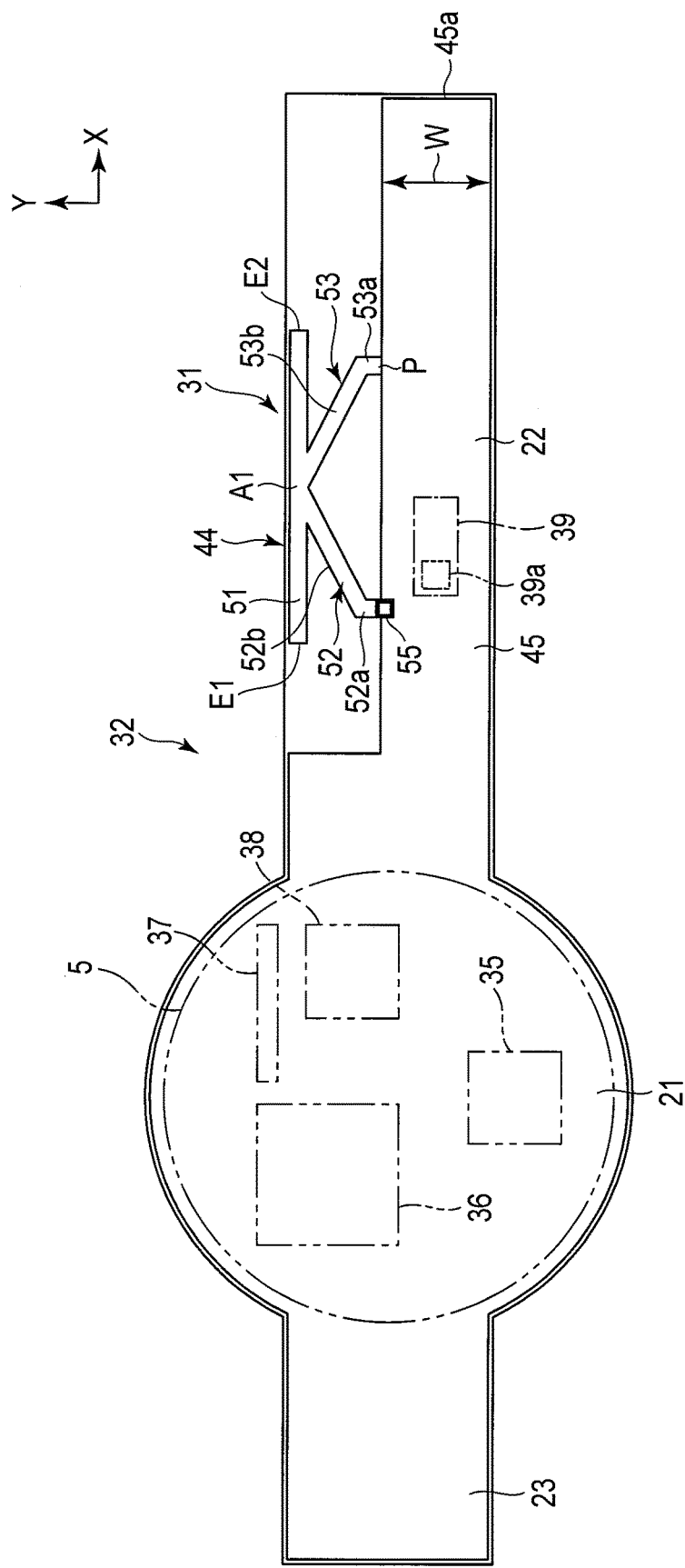
FIG. 3 is an exemplary plan view illustrating a flexible board of the electronic device shown in FIG. 1.

The device main unit 12 comprises a flexible board 32 (see FIG. 3). The flexible board 32 has flexibility (i.e., bendability or pliability). The flexible board 32 is covered by, for example, an insulating resin 33 (i.e., mold resin) and faces the inner surface of the cover 11 such that the flexible board 32 is at least partially covered by the cover 11. Note that "[T]he flexible board 32 is ( . . . ) covered by the cover" includes a case where a flexible board is covered directly by a cover and a case where a flexible board is covered by a cover with the board covered by, for example, an insulating resin (i.e., mold resin).

FIG. 3 schematically illustrates the flexible board 32 included in the device main unit 12. Note that a wiring pattern formed on the back surface of the flexible board 32 is indicated as a solid line for explanation in FIG. 3 and the subsequent similar figures described later. The flexible board 32 extends sequentially over, for example, the first portion 21, the second portion 22 and the third portion 23 of the device main unit 12.

As shown in FIG. 3, the first portion 21 of the device main unit 12 comprises a controller 35, a storage unit 36, an antenna 37 (i.e., second antenna) and a communication module 38. The controller 35, the storage unit 36, the antenna 37 and the communication module 38 are mounted on, for example, a first surface 32a (e.g., top surface; see FIG. 9) of the flexible board 32 and overlapped with the display 5 in a thickness direction of the electronic device 1.

The controller 35 is an IC chip (for example, a CPU) which controls the whole operation of the electronic device 1. The storage unit 36 is an IC chip which stores information input in the electronic device 1. The storage unit 36 is a NAND memory chip, for example, but is not limited thereto.

The antenna 37 is an antenna for Bluetooth (registered trademark), for example, but is not limited thereto. The antenna 37 performs wireless communication, for example, by radiating electric waves (i.e., using a radiation electromagnetic field). The communication distance of the antenna 37 is greater than that of the coupler 31, which will be described later. The antenna 37 is another example of an "output device" and can output (e.g., transmit wirelessly) outside at least a part of data received by the coupler 31. The communication module 38 performs wireless communication by using the antenna 37.

As shown in FIGS. 2 and 3, the second portion 22 and the third portion 23 of the device main unit 12 are positioned separately at both ends of the first portion 21 and covered by the cover 11. That is, the second portion 22 and the third portion 23 face the inner surface of the cover 11. As described above, the insulating resin 33 covering the flexible board 32 has flexibility. Therefore, each of the second portion 22 and the third portion 23 has flexibility (i.e., bendability or pliability) and can be deformed in accordance with the deformation (e.g., bending) of the cover 11. The second portion 22 and the third portion 23 are attached to the inner surface of the cover 11 and form the band portions 3a and 3b integrally with the cover 11.

As shown in FIGS. 1 and 2, the second portion 22 of the device main unit 12 comprises a coupler mounting region 15, which is equipped with the coupler 31. As shown in FIGS. 2 and 3, the second portion 22 comprises the coupler 31 (i.e., antenna) and a communication module 39. That is, the coupler 31 and the communication module 39 are provided in the band portion 3a. Note that the communication module 39 may be provided in the first portion 21 of the device main unit 12.

The above-mentioned structure can also be described as follows: the cover 11 comprises a frame portion 41 (i.e., main part), to which the display unit 2 is attached, and a pair of band portions 42a and 42b, which are separately arranged on both sides of the frame portion 41; and the coupler 31 and the communication module 39 are arranged in a region covered by the band portion 42a of the cover 11.

Next, the coupler 31 of the first embodiment will be described in detail.

The coupler 31 transmits and receives data by electromagnetic coupling (i.e., electrostatic field [quasi-electromagnetic field] or induced electric field coupling) between the coupler 31 and another coupler (i.e., antenna). The coupler 31 is an antenna used for close proximity wireless communication (i.e., near field wireless communication). In close proximity wireless communication, data transfer is performed between devices that are in close proximity to each other. The scheme of close proximity wireless communication is TransferJet (registered trademark), for example, but is not limited thereto. TransferJet is a close proximity wireless communication scheme using ultra wide band (UWB). When two devices approach within the range of communication (for example, 3 cm), the couplers provided in the devices are electromagnetically coupled. This coupling allows the devices to perform peer-to-peer wireless communication.

The electronic device 1 according to the first embodiment may be used by abutting or approaching the communication surface of a digital device (e.g., box) that provides various kinds of services. When a device equipped with the coupler 31 is in close proximity to another device (referred to as "external device" hereinafter) in different postures (for example, the posture of the coupler 31 is vertically to the external device or the posture of the coupler 31 is horizontally to the external device), the coupler 31 is electromagnetically coupled to the external device in either posture.

In the following, the structure of the coupler 31 will be described.

FIG. 4 is an exemplary schematic view of the structure of the coupler 31. As shown in FIG. 4, the coupler 31 comprises an antenna pattern 44 (i.e., element) and a ground 45. The antenna pattern 44 comprises a coupling element 51, a feeding element 52 and a short-circuiting element 53. Each of these elements extends linearly.

The coupler 31 of the first embodiment is formed as a plane-shape coupler on the flexible board 32 and has flexibility. The coupler 31 is formed by, for example, a wiring pattern provided on the surface of the flexible board 32. The coupler 31 can be used in a state of being bent in a curved shape along the outer shape of the band portion 3a, when the band portion 3a is put on a user's arm.

The coupling element 51 (i.e., first conducting element or first conducting portion) is an element for electromagnetically coupling the coupler 31 with another coupler. The coupling element 51, comprising a first open end E1 and a second open end E2, is an elongated element linearly extending in, for example, a first direction X. The first open end E1 is one end of the coupling element 51, to which no electrical conductor is connected, while the second open end E2 is the other end of the coupling element 51, to which no electrical conductor is connected.

The coupling element 51 comprises a mid-point A1 positioned between the first open end E1 and the second open end E2. The mid-point A1 is a middle point between the open ends E1 and E2 of the coupling element 51. That is, the mid-point A1 of the coupling element 51 is positioned in the center in a longitudinal direction of the coupling element 51. The distance between the first open end E1 and the mid-point A1 is equivalent to the distance between the second open end E2 and the mid-point A1. The mid-point A1 is an example of a "connecting point."

As shown in FIG. 4, a feeding terminal 55 is provided between the feeding element 52 and the ground 45. The feeding terminal 55 comprises a positive-side feed-point 55a and a ground-side feed-point 55b. The feeding terminal 55 may be a connector, to which a coaxial cable configured to transmit a signal is connected. This connector comprises a positive-side terminal connected to the internal conductor of the coaxial cable and a ground-side terminal connected to the external conductor of the coaxial cable. The positive-side feed-point 55a of the feeding terminal 55 is, for example, the positive-side terminal of the above-mentioned connector. The ground-side feed-point 55b of the feeding terminal 55 is, for example, the ground-side terminal of the above-mentioned connector and is connected to the ground 45. Note that the positive-side feed-point 55a will be hereinafter referred to as feed-point 55a.

The feeding element 52 (i.e., second conducting element or second conducting portion) is an example of a "first connecting element." The feeding element 52 is electrically connected to the mid-point A1 of the coupling element 51 for feeding the coupling element 51 to flow current from the feed-point 55a. The feeding element 52 connects the feed-point 55a and the mid-point A1 of the coupling element 51. In detail, one end of the feeding element 52 is connected to the feed-point 55a while the other end of the feeding element 52 is connected to the mid-point A1 of the coupling element 51. In the first embodiment, the feeding element 52 is directly connected to the mid-point A1 of the coupling element 51.

As shown in FIG. 4, the feeding element 52 comprises a first portion 52a and a second portion 52b and is bent therebetween. The first portion 52a is connected to the feed-point 55a. The first portion 52a extends linearly in a second direction Y, which is substantially orthogonal to the above-mentioned first direction X. The second portion 52b extends linearly between the first portion 52a and the mid-point A1 of the coupling element 51. The second portion 52b also extends in a direction intersecting with the first direction X and the second direction Y at a slant (in other words, in a direction intersecting with the coupling element 51 at a slant).

As shown in FIG. 4, a short-circuiting point P is positioned between the short-circuiting element 53 and the ground 45. The short-circuiting point P is a connecting position that connects the antenna pattern 44 to the ground 45. The coupler 31 comprises a center line C that passes through the mid-point A1 of the coupling element 51 in the second direction Y. The feeding terminal 55 and the short-circuiting point P are positioned separately at both sides of the center line C of the coupler 31. The distance in the first direction X between the feeding terminal 55 and the short-circuiting point P is not limited particularly and may be defined as a distance suitable for the lengths of the feeding element 52 and the short-circuiting element 53.

The short-circuiting element 53 (i.e., third conducting element or third conducting portion) is an example of a "second connecting element." Note that the short-circuiting element 53 may constitute an example of the "first connecting element." In this case, the feeding element 52 constitutes an example of the "second connecting element."

The short-circuiting element 53 is electrically connected to the mid-point A1 of the coupling element 51 to allow current to flow from the feed-point 55a. The short-circuiting element 53 connects the mid-point A1 of the coupling element 51 and the short-circuiting point P. In detail, one end of the short-circuiting element 53 is connected to the mid-point A1 of the coupling element 51 while the other end of the short-circuiting element 53 is connected to the short-circuiting point P. In the first embodiment, the short-circuiting element 53 is directly connected to the mid-point A1 of the coupling element 51.

As shown in FIG. 4, the short-circuiting element 53 comprises a first portion 53a and a second portion 53b and is bent therebetween. The first portion 53a is connected to the short-circuiting point P and extends linearly in the second direction Y. The second portion 53b extends linearly between the first portion 53a and the mid-point A1 of the coupling element 51. The second portion 53b extends in a direction intersecting with the first direction X and the second direction Y at a slant (in other words, in a direction intersecting with the coupling element 51 at a slant).

From the above-mentioned structure, the antenna pattern 44 comprising the coupling element 51, the feeding element 52 and the short-circuiting element 53 has a shape symmetrical with respect to the mid-point A1 of the coupling element 51 (that is, with respect to the center line C).

Next, electrical lengths of the coupling element 51 will be described.

The electrical length between the mid-point A1 and the first open end E1 of the coupling element 51 is L1 (i.e., first electrical length). L1 is defined as $n \times \lambda/4$, where $\lambda$ is a wavelength corresponding to the frequency used for the above-mentioned close proximity wireless communication. In detail, $\lambda$ is the wavelength corresponding to a center frequency within a frequency band used for close proximity wireless communication. It is assumed that n is an odd number greater than or equal to 1. In other words, the electrical length between the mid-point A1 and the first open end E1 of the coupling element 51 is an odd multiple of ¼ of a wavelength $\lambda$. In the first embodiment, it is exemplified that L1 is defined as $\lambda/4$. Similarly, the electrical length between the mid-point A1 and the second open end E2 of the coupling element 51 is L1, which is the same as the electrical length between the mid-point A1 and the first open end E1 of the coupling element 51.

Since the electrical length between the mid-point A1 of the coupling element 51 and the first open end E1 is $n \times \lambda/4$ as mentioned above, the element portion between the mid-point A1 of the coupling element 51 and the first open end E1 functions as a single resonant antenna portion (i.e., resonator). Similarly, since the electrical length between the mid-point A1 and the second open end E2 of the coupling element 51 is $n \times \lambda/4$ as mentioned above, the element portion between the mid-point A1 of the coupling element 51 and the second open end E2 functions as another single resonant antenna portion (i.e., resonator). Thus, the coupling element 51 itself functions as a resonator.

In the coupler 31, it is therefore possible to pass a large amount of current corresponding to a signal in a desired frequency zone, without providing an exclusive resonant circuit such as a resonant stub in addition to the coupling element 51. As a result, on the upper face of the coupler 31, a portion along a longitudinal direction of the coupling element 51, i.e., a region surrounding the coupling element 51 (e.g., the upper region of the coupler 31), functions as a coupling portion that can be coupled with another coupler.

Since the feeding element 52 is connected to the mid-point A1 of the coupling element 51 as described above, a current distribution (i.e., charge distribution) in the element portion between the mid-point A1 of the coupling element 51 and the first open end E1 is symmetrical with a current distribution (i.e., charge distribution) in the element portion between the mid-point A1 of the coupling element 51 and the second open end E2. Therefore, when the antenna of a peer device is arranged in close proximity to either of the element portion between the mid-point A1 of the coupling element 51 and the first open end E1 or the element portion between the mid-point A1 of the coupling element 51 and the second open end E2, it is possible to make the electromagnetic coupling strength between the couplers equivalent.

The coupling element 51 can function as a coupling element that electromagnetically connects the coupler 31 and its peer device easily in, for example, the second direction Y (i.e., coupler horizontal direction).

As shown in FIGS. 2 and 3, the band portion 3a of the first embodiment comprises a first edge portion 57a and a second edge portion 57b, which extend in a circumferential direction of a user's arm. The first edge portion 57a is positioned near the user's hand, for example, with the electronic device 1 put on the user's arm. The second edge portion 57b is positioned opposite the first edge portion 57a. The coupling element 51 is arranged in the first edge portion 57a of the band portion 3a and is arranged substantially parallel to the first edge portion 57a. Therefore, the coupling element 51 can be coupled with a communication partner in a direction, for example, from the user's arm toward the user's hand with the band portion 3a put on the user's arm.

Next, each of the electrical length of the feeding element 52 and the short-circuiting element 53 will be described.

In the first embodiment, an electrical length L2 (i.e., second electric length) of each of the feeding element 52 and the short-circuiting element 53 is defined as an odd multiple of ¼ of the wavelength λ so that a region (e.g., center region) between a region surrounding the coupling element 51 and the ground 45 can be used as a coupling portion. That is, L2 is m×λ/4. It is assumed that m is an odd number greater than or equal to 1. In other words, the electrical length L2 of each of the feeding element 52 and the short-circuiting element 53 is an odd multiple of ¼ of the wavelength λ. Note that the electrical length may differ in the feeding element 52 and the short-circuiting element 53. In the first embodiment, it is exemplified that L1 is defined as λ/4 and L2 λ/4.

Thus, when the electrical length L2 of each of the feeding element 52 and the short-circuiting element 53 is defined as an odd multiple of ¼ of the wavelength λ, each of the feeding element 52 and the short-circuiting element 53 functions as a resonant antenna portion (i.e., resonator). As a result, a large amount of current flows to each of the feeding element 52 and the short-circuiting element 53. Therefore, on the upper face of the coupler 31, two regions along a longitudinal direction of the feeding element 52 and the short-circuiting element 53, respectively, function as a coupling portion that can be coupled with another coupler.

Accordingly, a region (e.g., center region) between a portion along a longitudinal direction of the coupling element 51 and the ground 45 can be used as a coupling portion.

As described above, the coupling element 51 can function as a coupling portion that electromagnetically connects the coupler 31 and its peer device easily in, for example, the second direction Y (i.e., coupler horizontal direction). On the other hand, each of the feeding element 52 and the short-circuiting element 53 can function as a coupling portion that electromagnetically connects the coupler 31 and its peer device easily in, for example, a third direction Z substantially orthogonal to the first direction X and the second direction Y (e.g., a direction vertical to the ground 45 and an orthogonal direction in FIG. 3). This allows the coupler 31 to be coupled electromagnetically with its peer device in either of the second direction Y and the third direction Z. In the first embodiment, each of the feeding element 52 and the short-circuiting element 53 can be coupled with a communication partner in a radial direction of a user's arm with the band portion 3a put on the user's arm.

Next, the charge distribution of the coupler 31 of the first embodiment will be described with reference to FIG. 5.

Since the feeding element 52 is connected to the mid-point A1 of the coupling element 51 as described above, a resonance represented by R1 occurs in the element portion between the mid-point A1 of the coupling element 51 and the first open end E1, and a current distribution occurs which gets larger as it approaches the first open end E1. Similarly, a resonance represented by R2 occurs in the element portion between the mid-point A1 of the coupling element 51 and the second open end E2, and a current distribution occurs which gets larger as it approaches the second open end E2. Therefore, when only the charge distribution based on the coupling element 51 is viewed, the middle point of the coupling element 51 serves as a so-called null point.

On the other hand, a resonance represented by R3 occurs in the feeding element 52 and the short-circuiting element 53. Therefore, a large amount of charge based on the resonances of the feeding element 52 and the short-circuiting element 53 accumulates near the middle point of the coupling element 51 to complement the null point. According to such a structure, since a charge distributes in a plurality of points of the coupling element 51, the coupler 31 can be easily coupled with a communication partner even when bent in a curved shape.

Each of the feeding element 52 and the short-circuiting element 53 comprises the first portions 52a and 53a extending in the second direction Y and the second portions 52b and 53b extending in a direction of crossing the coupling element 51 diagonally. Even when a longitudinal direction of the coupling element of the coupler of a peer device is misaligned to a longitudinal direction (e.g., first direction X) of the coupling element 51 of the coupler 31, these couplers can be easily coupled.

Also, in the first embodiment, each of the feeding element 52 and the short-circuiting element 53 comprises the first portions 52a and 53a and the second portions 52b and 53b extending in a different direction, respectively. According to such a structure, it is possible to support various orientations of the coupling element of the coupler of another device facing the upper surface of the coupler 31.

The position the feeding terminal 55 in the direction X may be located between the mid-point A1 and the first open end E1, not immediately beneath the mid-point A1 of the coupling element 51. Thus, the position of the feeding terminal 55 in the direction X can be arranged in a position offset from the position immediately beneath the mid-point A1 of the coupling element 51. Similarly, the position of the short-circuiting point P in the direction X may be positioned between the mid-point A1 and the second open end E2, not immediately beneath the mid-point A1 of the coupling element 51. Thus, the position of the short-circuiting point P in the direction X can be arranged in a position offset from the position immediately beneath the mid-point A1 of the coupling element 51. This restrains the size in a width direction of the coupler 31 from increasing excessively, even if the electrical length L2 of each of the feeding element 52 and the short-circuiting element 53 is increased.

Next, how the coupler 31 works will be described with reference to FIG. 6.

In FIG. 6, (a) illustrates a flat small antenna. The entire length of a coupling element 51' of the small antenna is $\lambda/2$. The length of a feeding element 52' is so short as to be negligible with respect to the wavelength $\lambda$. The feeding element 52' connects the feed-point 55a (i.e., positive-side feed-point) and the mid-point A1 of the coupling element 51'. A short-circuiting element 53' connects the mid-point A1 of the coupling element 51' and the ground 45. In this small coupler, only the coupling element 51' functions as a coupling portion.

In FIG. 6, (b) illustrates a coupler structure corresponding to the coupler 31 according to the first embodiment. In the coupler structure, the feeding element 52' is replaced with the feeding element 52 having an entire length of $\lambda/4$. The short-circuiting element 53' is replaced with the short-circuiting element 53 having a length of $\lambda/4$. Each of the feeding element 52 and the short-circuiting element 53 having a length of $\lambda/4$ can function as a resonator and a coupler as described above. Therefore, the coupler structure comprises three coupling portions. This allows a device equipped with a coupler and another device to be easily coupled.

Next, how the coupler 31 is mounted will be described with reference to FIG. 3.

The flexible board 32 comprises the first surface 32a (for example, front surface; see FIG. 9) and a second surface 32b (for example, back surface; see FIG. 8), which is positioned opposite the first surface 32a. The coupling element 51, the feeding element 52, the short-circuiting element 53, the feeding terminal 55 (e.g., connector) and the ground 45 are formed of a wiring pattern provided on, for example, the second surface 32b and are located on substantially the same plane.

Note that "located on substantially the same plane" means not being located separately from the surface of the flexible board 32. That is, "located on substantially the same plane" includes a case where the coupling element 51, the feeding element 52, the short-circuiting element 53, the feeding terminal 55 (e.g., connector) and the ground 45 are arranged separately on the first surface 32a and the second surface 32b of the flexible board 32.

As shown in FIG. 3, in the first embodiment, each of the thickness (i.e., width) of the feeding element 52 and the short-circuiting element 53 is substantially equivalent to that of the coupling element 51. Therefore, the feeding element 52 and the short-circuiting element 53 can be stably coupled with the coupler of a peer device.

In the first embodiment, the ground 45 (e.g., ground plate) extends in the first direction X to be formed in a plate shape. The ground 45 has a width W in the second direction Y. The width W (i.e., electrical length) of the ground 45 is defined as $\lambda/4$ of the wavelength $\lambda$. When the width W (i.e., electrical length) of the ground 45 is defined as $\lambda/4$ of the wavelength $\lambda$, it is possible to strengthen the resonance of the coupler 31. Note that the width W of the ground 45 may be, for example, smaller than $\lambda/4$ of the wavelength $\lambda$.

The ground 45 extends beyond the coupling element 51, the feeding element 52 and the short-circuiting element 53 in a longitudinal direction (i.e., first direction X) of the band portion 3a, when viewed from the display unit 2. Note that the uniform ground 45 is provided on the second surface 32b of the flexible board 32 in the first portion 21 and the third portion 23 of the device main unit 12. That is, the ground 45 is extended sequentially from the third portion 23 to the second portion 22 through the first portion 21.

As shown in FIG. 3, the ground 45 comprises an end 45a, which is near the end of the band portion 3a. In the first embodiment, the short-circuiting element 53 and the short-circuiting point P are nearer to the end 45a of the ground 45 than the feeding element 52 and the feed-point 55a. According to such a structure, the ground 45 that affects the resonance of the coupler 31 is apparently small so that the resonance of the coupler 31 is less likely to attenuate.

On the first surface 32a of the flexible board 32, the close proximity wireless communication module 39 may be equipped, for example. The communication module 39 comprises an electronic component 39a such as a high-frequency circuit (RF circuit). The communication module 39 performs close proximity wireless communication by using the coupler 31.

Note that the feeding terminal 55 may be provided on the first surface 32a of the flexible board 32. In this case, the feed-point 55a of the feeding terminal 55 may be connected to the feeding element 52 through a via (e.g., through-hole), and the ground-side feed-point 55b of the feeding terminal 55 may be connected to the ground 45 through a via.

Next, an example of how the electronic device 1 is used will be described.

The electronic device 1 is a music player, for example. By abutting or approaching the communication surface of a digital device (e.g., box) that provides various kinds of services, the electronic device 1 is capable of receiving music data from the digital device. The electronic device 1 is capable of displaying on the display 5 the information (for example, name of tune and replay time) of the music data and transmitting the music information of a wireless earphone via the antenna 37. Note that the electronic device 1 may be used in various ways, not limited to the above-mentioned ways.

According to the above-mentioned structure, it is possible to provide the electronic device 1 capable of improving convenience. That is, the electronic device 1 of the first embodiment comprises the cover 11, the flexible board 32, at least a part of which is covered by the cover 11, the coupler 31 provided on the flexible board 32 and having flexibility, the communication module 39 configured to perform close proximity wireless communication by using the coupler 31, and an output device (for example, display 5 or antenna 37) configured to output at least a part of data received by the coupler 31. According to such a structure, it is possible to incorporate the coupler 31 having flexibility into various devices and to use the electronic device 1 in many occasions since at least a part of the data received by the coupler 31 can be output by the output device. Therefore, it is possible to improve convenience of the electronic device 1.

In the first embodiment, the electronic device 1 comprises the display unit 2, which comprises the output device, and the band portion 3a is configured to be bent with respect to the display unit 2 and to be curved along a user's arm, and the coupler 31 is provided in the band portion 3a. Such a structure improves design flexibility of the display unit 2 since the coupler 31 having flexibility is equipped with the band portion 3a. Therefore, it is possible to provide the electronic device 1 capable of further improving convenience.

In the first embodiment, the coupler 31 is in a plane shape and can be used in a state of being bent in a curved shape along the outer shape of the band portion 3a. According to such a structure, it is possible to use the coupler 31 with the electronic device 1 put on the arm and to further improve convenience of the electronic device 1.

In the first embodiment, all of the coupling element 51, the feeding element 52, the short-circuiting element 53 and the ground 45 are provided on a surface of the flexible board 32 and positioned on substantially the same plane. According to such a structure, it is possible to equip the coupler 31 in, for example, a portion that can be bent to a great extent, since the flexibility (i.e., bendability or pliability) of the coupler 31 is further improved. It is thereby possible to further improve design flexibility and convenience of the electronic device 1.

In the first embodiment, the band portion 3a comprises the edge portion 57a extending in a circumferential direction of a user's arm. The coupling element 51 is arranged substantially parallel to the edge portion 57a of the band portion 3a. According to such a structure, it is possible to easily form the coupling element 51 in a relatively large size and make the coupler 31 larger. If the coupler 31 is made larger, it is possible to easily align with a communication partner and to further improve convenience of the electronic device 1.

In the first embodiment, the coupling element 51 can be coupled with a communication partner in a direction from the user's arm toward the user's hand with the band portion 3a put on the user's arm. According to such a structure, it is possible to use the coupler 31 in various embodiments and to further improve convenience of the electronic device 1.

In the first embodiment, the electrical length L2 of at least either the feeding element 52 or the short-circuiting element 53 is defined as an odd multiple of ¼ of the wavelength λ. According to such a structure, the coupler 31 can be coupled with a communication partner in a radial direction of a user's arm and can communicate in a plurality of directions with also using the coupling element 51. This further improves convenience of the electronic device 1.

That is, the coupling element 51 can function as a coupling portion that can be easily coupled in, for example, a horizontal direction (e.g., second direction Y). Also, at least either the feeding element 52 or the short-circuiting element 53 can function as a coupling portion that can be easily coupled in, for example, a vertical direction (e.g., third direction Z). It is thereby possible to provide the coupler 31 that can be easily coupled in two directions including horizontal and vertical directions. The coupler 31 has excellent convenience as it can be used in various ways, and is therefore suitable as the coupler 31 equipped with, for example, a wristband mobile device.

In the first embodiment, the electrical length L2 of both the feeding element 52 and the short-circuiting element 53 is defined as an odd multiple of ¼ of the wavelength λ. According to such a structure, since both the feeding element 52 and the short-circuiting element 53 function as a resonator, it is easier to couple with a communication partner. This further improves convenience of the electronic device 1.

In the first embodiment, the ground 45 extends beyond the coupling element 51, the feeding element 52 and the short-circuiting element 53 in a longitudinal direction of the band portion 3a, when viewed from the display unit 2. According to such a structure, it is possible to define the ground 45 in an appropriate size.

In the first embodiment, the output device is the antenna 37 that has a longer communication distance than the coupler 31, and wirelessly transmits at least a part of data received by the coupler 31. According to such a structure, it is possible to further transmit the data received by the coupler 31 wirelessly. It is thereby possible to use the electronic device 1 in further various embodiments and to further improve convenience of the electronic device 1.

In the following, the electronic device 1 according to the second to seventh embodiments will be described. Note that the structures having the same or similar functions as/to the first embodiment will be put the same reference numbers to omit explanation. Also, the structures other than described below are the same as the first embodiment.

Second Embodiment

Figure 7:
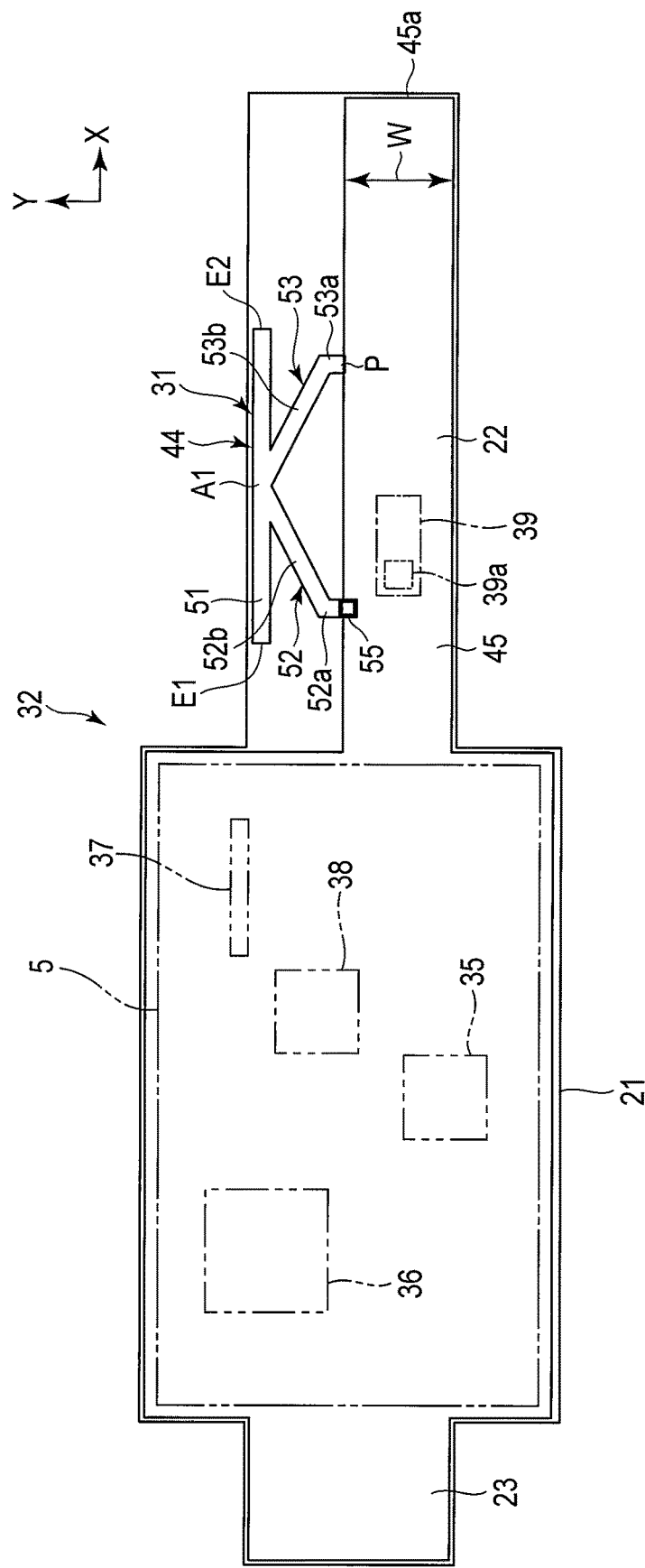
FIG. 7 is an exemplary plan view illustrating a flexible board of an electronic device according to a second embodiment.

FIG. 7 illustrates the flexible board 32 of the electronic device 1 according to the second embodiment. The second embodiment differs from the first embodiment in the outer shape of the device main unit 12 (e.g., the outer shape of the display unit 2). The other structures are the same as the first embodiment.

The result of the characteristic measurement of the coupler 31 will be described with reference to FIGS. 8 to 10. FIGS. 8 and 9 illustrate measurement conditions.

Under the measurement condition of FIG. 8, the coupler 31 and a reference coupler 61 (i.e., reference antenna) are separated by 15 mm in a vertical direction (e.g., third direction Z). That is, the coupler 31 is positioned separately by a distance of 15 mm from the upper surface of the reference coupler 61 (i.e., reference antenna).

Note that an antenna widely known in this field should be used for the reference coupler 61 (i.e., reference antenna). In the example of FIG. 8, the reference coupler 61 (i.e., reference antenna) comprises a resonant circuit 62, a coupling element 63 and a ground 64.

Under the measurement condition of FIG. 9, the coupler 31 and the reference coupler 61 (i.e., reference antenna) are separated by 15 mm in a horizontal direction (e.g., second direction Y). That is, the coupler 31 is positioned separately by a distance of 15 mm from the reference coupler 61 (i.e., reference antenna).

Figure 10:
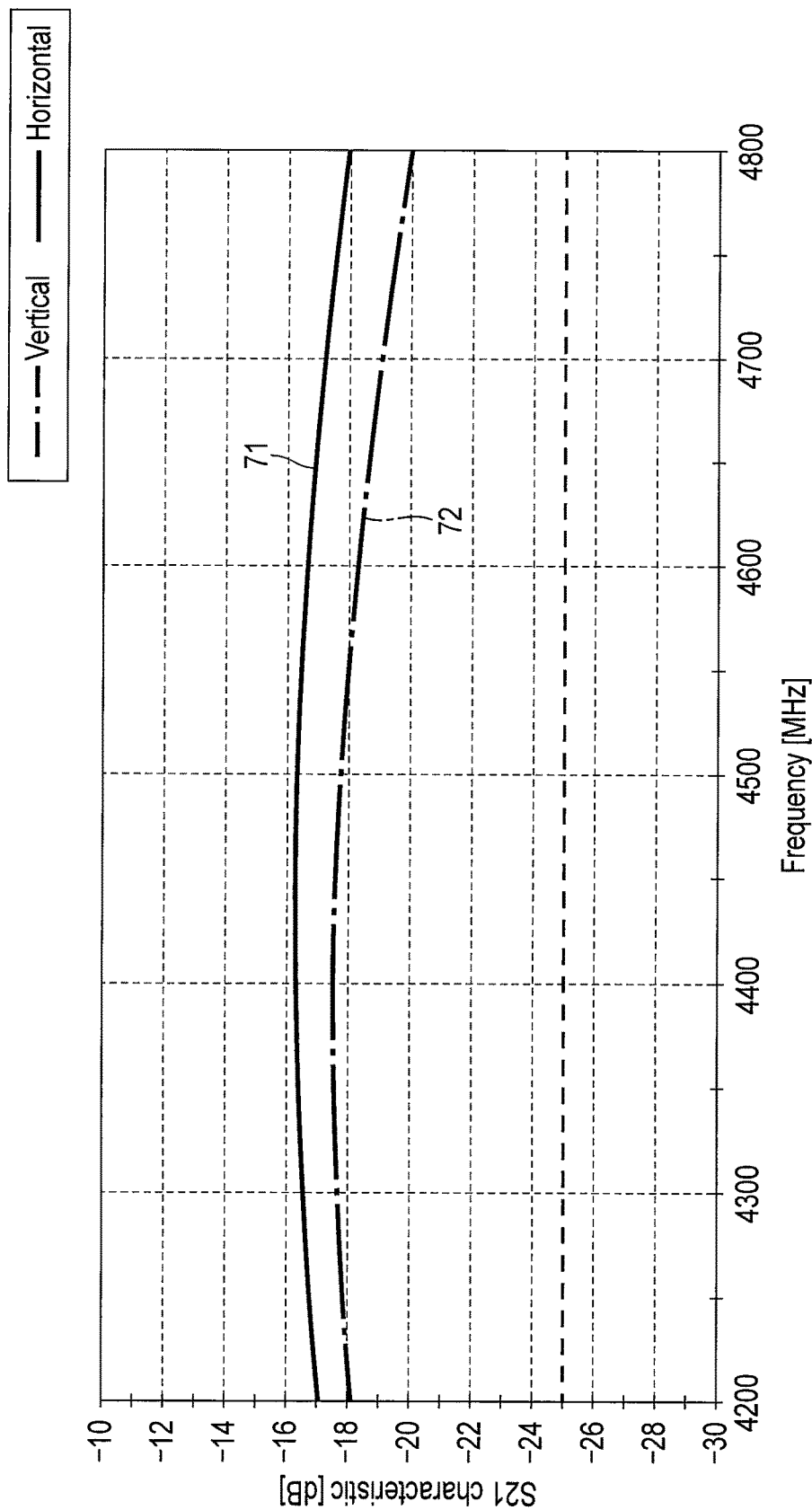
FIG. 10 is a graph illustrating a measurement result of a characteristic of the coupler shown in FIG. 7.

FIG. 10 illustrates a S21 characteristic of the coupler 31 under the measurement conditions of FIGS. 8 and 9. In FIG. 10, the horizontal axis represents a frequency and the vertical axis represents an S21 [dB]. In FIG. 10, 71 represents the S21 characteristic of the coupler 31 under the measurement condition (horizontally-faced) of FIG. 9, and 72 represents the S21 characteristic of the coupler 31 under the measurement condition (vertically-faced) of FIG. 8. In either measurement condition, a sufficient characteristic can be obtained in a frequency region having a desired frequency of approximately 4.48 GHz. That is, it can be said that the coupler 31 is easy to be coupled electromagnetically either in a horizontal direction (e.g., second direction Y) or a vertical direction (e.g., third direction Z).

According to the above-mentioned structure, it is possible to provide the electronic device 1 capable of improving convenience, as with the first embodiment.

Third Embodiment

FIG. 11 illustrates the flexible board 32 of the electronic device 1 according to the third embodiment. The third embodiment differs from the second embodiment in the shape of the coupler 31. The other structures are the same as the second embodiment.

As shown in FIG. 11, the coupler 31 comprises the first antenna pattern 44 and a second antenna pattern 81. Each of the first antenna pattern 44 and the second antenna pattern 81 comprises the coupling element 51, the feeding element 52 and the short-circuiting element 53, as with the antenna pattern 44 of the second embodiment. The feeding element 52 of the second antenna pattern 81 is connected to the ground-side feed-point 55b of the feeding terminal 55. The short-circuiting element 53 of the first antenna pattern 44 is connected to the short-circuiting element 53 of the second antenna pattern 81 at a connecting point P.

In the second antenna pattern 81, the electrical length L1 between the mid-point A1 of the coupling element 51 and the first open end E1 is an odd multiple of ¼ of the wavelength λ, and the electrical length L1 between the mid-point A1 of the coupling element 51 and the second open end E2 is an odd multiple of ¼ of the wavelength λ. Also, in the second antenna pattern 81, the electrical length L2 of each of the feeding element 52 and the short-circuiting element 53 is defined as an odd multiple of ¼ of the wavelength λ.

According to such a structure, it is possible to provide the electronic device 1 capable of improving convenience, as with the first embodiment. Further, according to the structure of the third embodiment, the coupling element 51, the feeding element 52 and the short-circuiting element 53 of the second antenna pattern 81 can function as a coupling portion. It is thereby possible to provide the coupler 31 that can be coupled more easily and to improve convenience of the electronic device 1.

Fourth Embodiment

Figure 12:
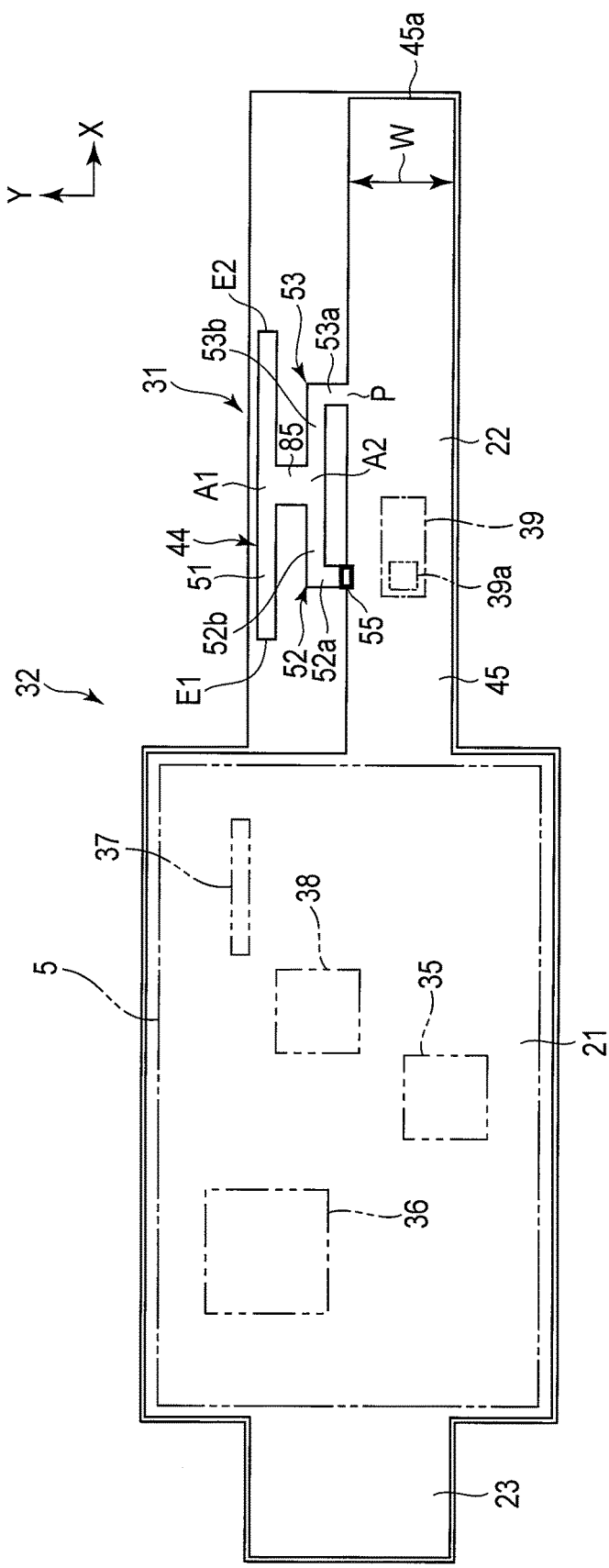
FIG. 12 is an exemplary plan view illustrating a flexible board of an electronic device according to a fourth embodiment.

FIG. 12 illustrates the flexible board 32 of the electronic device 1 according to the fourth embodiment. FIG. 13 schematically illustrates the coupler 31 according to the fourth embodiment. The fourth embodiment differs from the second embodiment in the shape of the coupler 31. The other structures are the same as the second embodiment.

In the fourth embodiment, the feeding element 52 and the short-circuiting element 53 are not directly connected to the mid-point A1 of the coupling element 51. The feeding element 52 and the short-circuiting element 53 are electrically connected to the mid-point A1 of the coupling element 51 via a connecting element 85.

In detail, each of the second portion 52b of the feeding element 52 and the second portion 53b of the short-circuiting element 53 extend in the first direction X. The feeding element 52 and the short-circuiting element 53 are connected to each other at a connecting point A2. The connecting element 85 extends between the connecting point A2 and the mid-point A1 of the coupling element 51 and connects the connecting point A2 of the coupling element 51 and the mid-point A1.

In the fourth embodiment, the electrical length L1 between the mid-point A1 of the coupling element 51 and the first open end E1 is an odd multiple of ¼ of the wavelength λ, as with the first embodiment. Also, the electrical length L1 between the mid-point A1 of the coupling element 51 and the second open end E2 is an odd multiple of ¼ of the wavelength λ. Further, the electrical length L2 of each of the feeding element 52 and the short-circuiting element 53 is defined as an odd multiple of ¼ of the wavelength λ.

According to such a structure, it is possible to improve convenience of the electronic device 1, as with the first embodiment. For example, since the feeding element 52 and the short-circuiting element 53 as well as the coupling element 51 function as a coupling portion, it is possible to provide the coupler 31 that can be easily coupled either in a horizontal direction (e.g., second direction Y) or a vertical direction (third direction Z) and to improve convenience of the electronic device 1.

Fifth Embodiment

Figure 14:
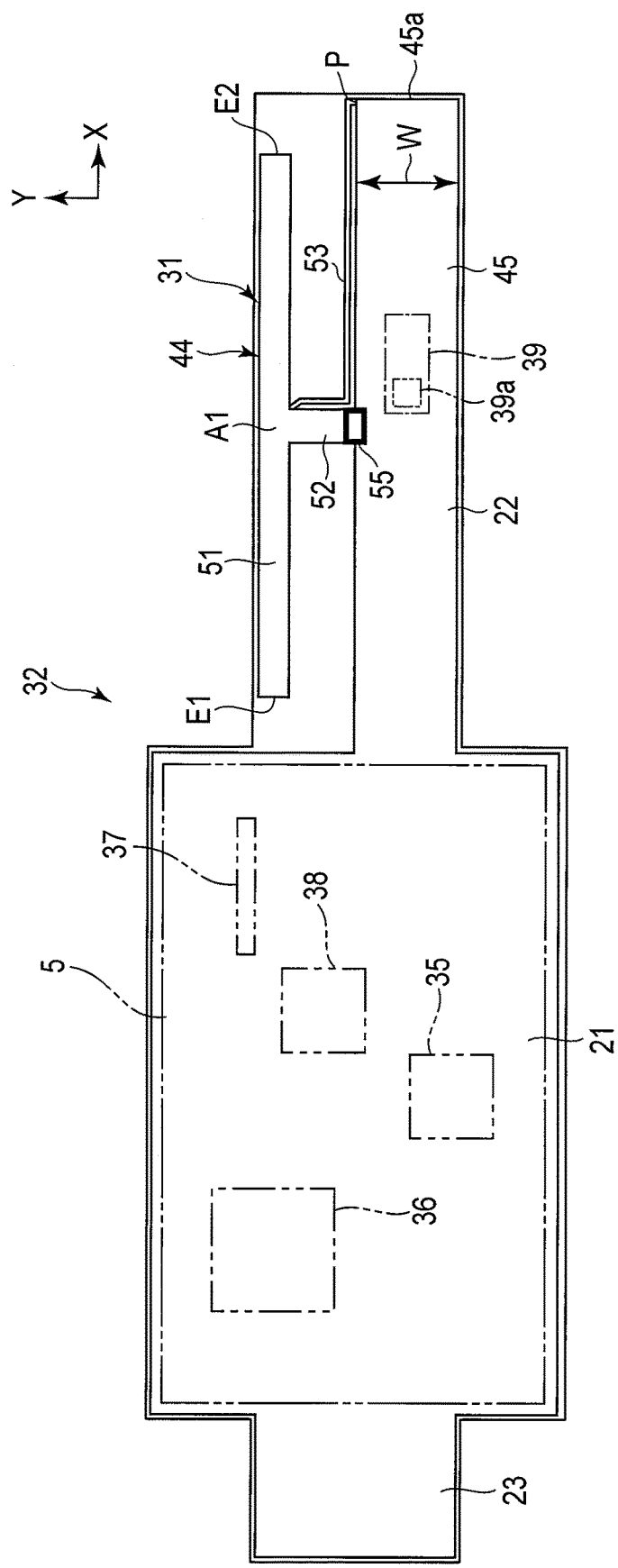
FIG. 14 is an exemplary plan view illustrating a flexible board of an electronic device according to a fifth embodiment.

FIG. 14 illustrates the flexible board 32 of the electronic device 1 according to the fifth embodiment. FIG. 15 schematically illustrates the coupler 31 according to the fifth embodiment. The fifth embodiment differs from the second embodiment in the shape of the coupler 31. The other structures are the same as the second embodiment.

In the fifth embodiment, the feed-point 55a (i.e., feeding terminal 55) is provided on the center line C of the coupler 31. The feeding element 52 extends linearly from the feed-point 55a to the mid-point A1 of the coupling element 51 and is directly connected to the mid-point A1 of the coupling element 51. In the fifth embodiment, the length of the feeding element 52 is not an odd multiple of ¼ of the wavelength λ.

On the other hand, the short-circuiting point P is provided on the end 45a of the ground 45. The short-circuiting element 53 is directly connected to the mid-point A1 of the coupling element 51, extends along the edge portions of the feeding element 52 and the ground 45, and connects the mid-point A1 to the short-circuiting point P of the coupling element 51.

In the fifth embodiment, the electrical length L1 between the mid-point A1 of the coupling element 51 and the first open end E1 is an odd multiple of ¼ of the wavelength λ, as with the first embodiment. Also, the electrical length L1 between the mid-point A1 and the second open end E2 of the coupling element 51 is an odd multiple of ¼ of the wavelength λ. Further, the electrical length L2 of the short-circuiting element 53 is defined as an odd multiple of ¼ of the wavelength λ.

According to such a structure, it is possible to improve convenience of the electronic device 1, as with the first embodiment. For example, since the short-circuiting element 53 as well as the coupling element 51 function as a coupling portion, it is possible to provide the coupler 31, which can be electromagnetically coupled either in a horizontal direction (e.g., second direction Y) or a vertical direction (e.g., third direction Z) easily, and to improve convenience of the electronic device 1.

Figure 16:
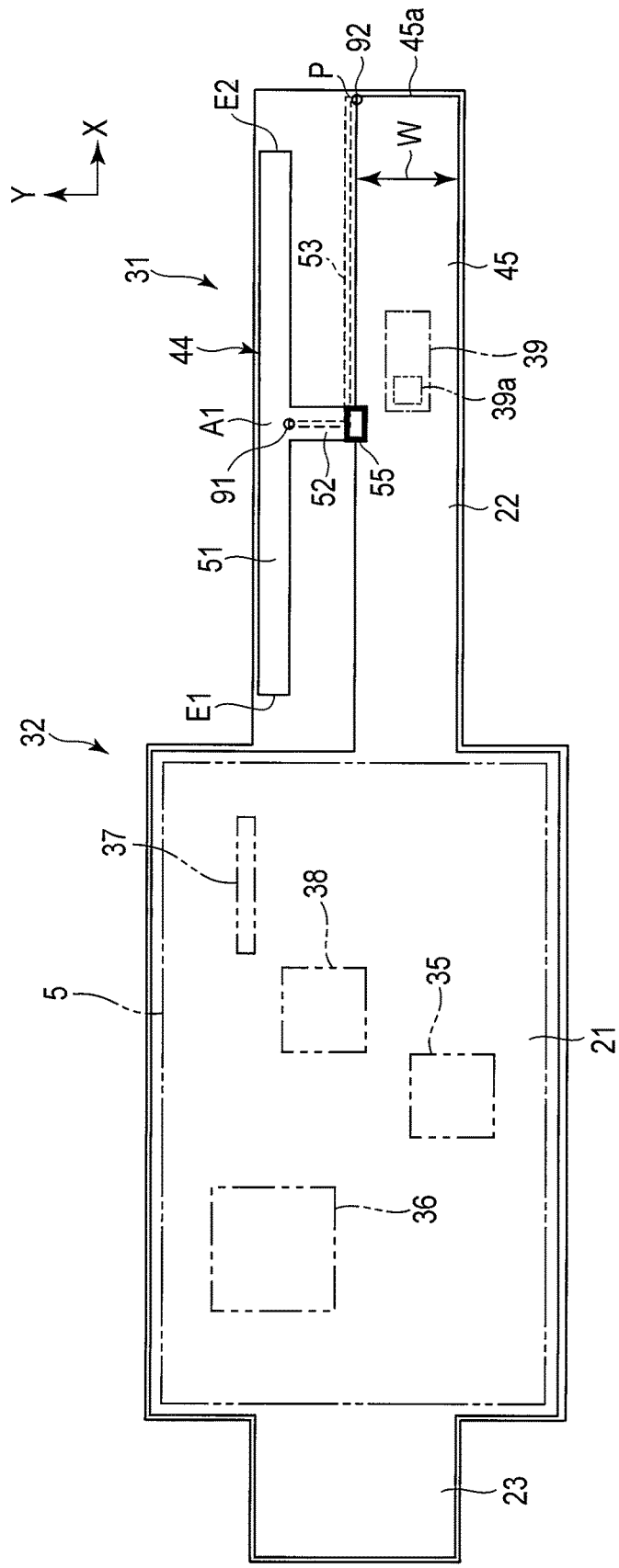
FIG. 16 is an exemplary view illustrating a modification of the coupler shown in FIG. 14.

FIG. 16 illustrates an example of a modification of the flexible board 32 according to the fifth embodiment. The coupler 31 is realized by using the first surface 32a and the second surface 32b of the flexible board 32. That is, the coupling element 51, the feeding element 52, the ground 45 and the feeding terminal 55 (e.g., connector) are provided on, for example, the second surface 32b of the flexible board 32. The structure of the coupling element 51, the feeding element 52, the ground 45 and the feeding terminal 55 are the same as that of the fifth embodiment.

The short-circuiting element 53 is provided on, for example, the first surface 32a of the flexible board 32. One end of the short-circuiting element 53 is connected to the mid-point A1 of the coupling element 51, which is provided on the second surface 32b, through a via 91 (e.g., throughhole). The other end of the short-circuiting element 53 is connected to the ground 45, which is provided on the first surface, through a via 92 (e.g., through-hole). According to such a structure, it is possible to provide the electronic device 1 having the same function as the fifth embodiment.

Sixth Embodiment

Figure 17:
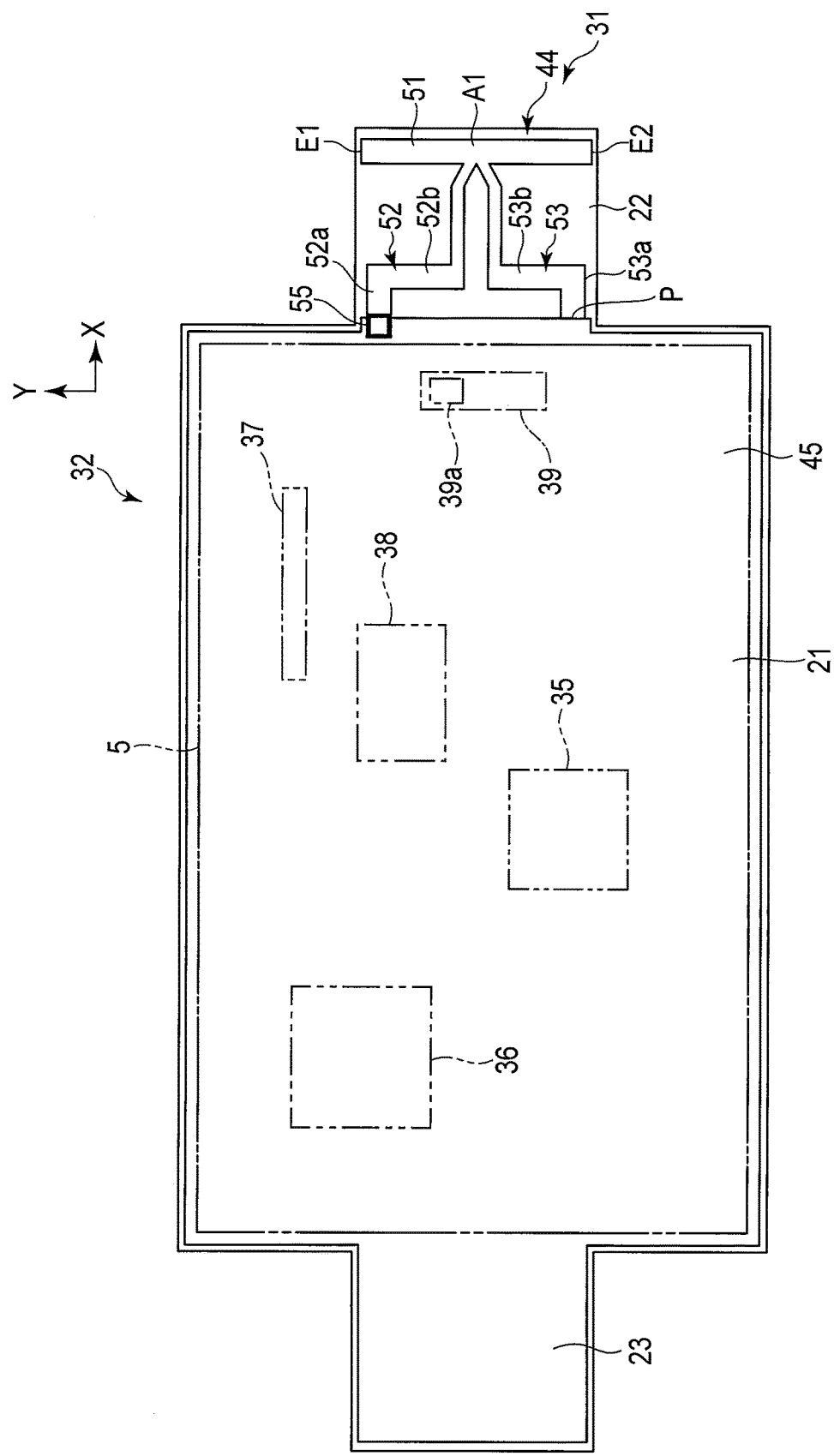
FIG. 17 is an exemplary plan view illustrating a flexible board of an electronic device according to a sixth embodiment.

FIG. 17 illustrates the flexible board 32 of the electronic device 1 according to the sixth embodiment. The sixth embodiment differs from the second embodiment in the shape of the coupler 31. The other structures are the same as the second embodiment.

In the sixth embodiment, the orientation of the coupler is different by substantially 90 degrees from that of the second embodiment. That is, the coupling element 51 extends in the second direction Y. In the sixth embodiment, the electrical length L1 between the mid-point A1 of the coupling element 51 and the first open end E1 is an odd multiple of ¼ of the wavelength λ, as with the first embodiment. Also, the electrical length L1 between the mid-point A1 and the second open end E2 of the coupling element 51 is an odd multiple of ¼ of the wavelength λ. Further, the electrical length L2 of the short-circuiting element 53 is defined as an odd multiple of ¼ of the wavelength λ.

According to such a structure, it is possible to improve convenience of the electronic device 1, as with the first embodiment. For example, since the feeding element 52 and the short-circuiting element 53 as well as the coupling element 51 function as a coupling portion, it is possible to provide the coupler 31 that can be easily coupled either in a horizontal direction (e.g., first direction X) or a vertical direction (e.g., third direction Z) and to improve convenience of the electronic device 1.

Seventh Embodiment

Figure 18:
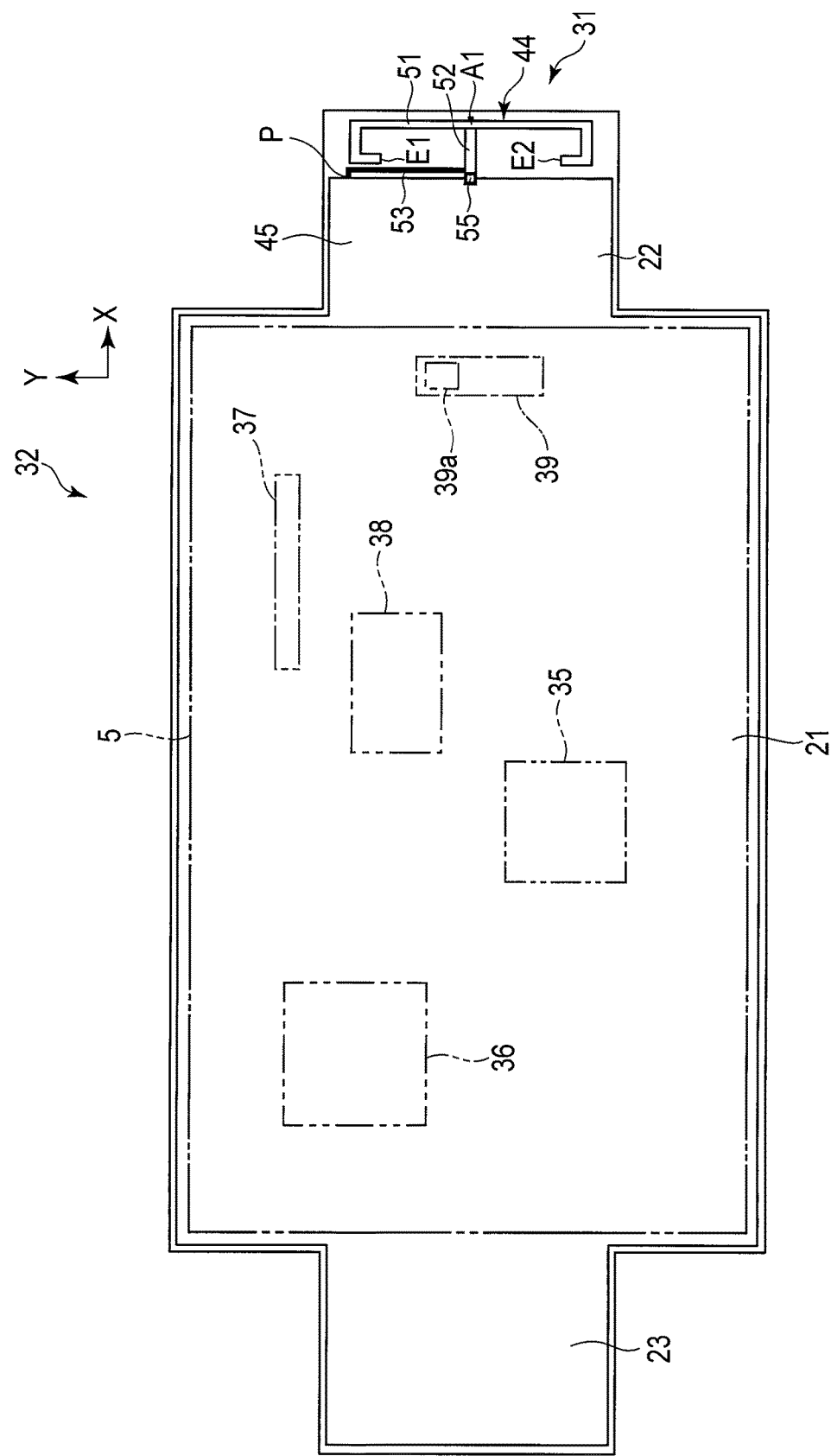
FIG. 18 is an exemplary plan view illustrating a flexible board of an electronic device according to a seventh embodiment.

FIG. 18 illustrates flexible the board 32 of the electronic device 1 according to the seventh embodiment. The seventh embodiment differs from the second embodiment in the shape of the coupler 31. The other structures are the same as the second embodiment.

In the seventh embodiment, the orientation of the coupler is different by substantially 90 degrees from that of the second embodiment. That is, the coupling element 51 extends in the second direction Y. Note that the shape of the coupler 31 is substantially the same as, for example, the fifth embodiment. In the seventh embodiment, the electrical length L1 between the mid-point A1 of the coupling element 51 and the first open end E1 is an odd multiple of ¼ of the wavelength λ, as with the first embodiment. Also, the electrical length L1 between the mid-point A1 of the coupling element 51 and the second open end E2 is an odd multiple of ¼ of the wavelength λ. Further, the electrical length L2 of the short-circuiting element 53 is defined as an odd multiple of ¼ of the wavelength λ.

According to such a structure, it is possible to improve convenience of the electronic device 1, as with the first embodiment. For example, since the short-circuiting element 53 as well as the coupling element 51 function as a coupling portion, it is possible to provide the coupler 31 that can be easily coupled either in a horizontal direction (e.g., first direction X) or a vertical direction (e.g., third direction Z) and to improve convenience of the electronic device 1.

While the first to seventh embodiments and example of deformation have been described above, the embodiment of the electronic device 1 is not limited thereto. The electronic device 1 may be, for example, a watch and a wristband for healthcare. Also, it is not necessary that both of the feeding element 52 and the short-circuiting element 53 function as a coupler. It is possible that only either of the elements functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a cover;
   a flexible board, at least a part of which is covered by the cover;
   a first antenna on the flexible board, the first antenna having flexibility;
   a communication module configured to perform close proximity wireless communication by using the first antenna;
   a display unit comprising an output device, the output device configured to output at least a part of data received by the first antenna; and
   a band portion comprising at least a part of the cover, the band portion configured to be bent with respect to the display unit such that the band portion is curved along a user's arm, wherein
   the first antenna is in the band portion,
   the flexible board comprises a first portion corresponding to the display unit, a second portion, and a third portion,
   the second and third portions are positioned separately at both ends of the first portion, and
   the second portion includes the first antenna.

2. The electronic device of claim 1, wherein
   the first antenna is in a plane shape, and the first antenna is configured to be used in a state of being bent in a curved shape along an outer shape of the band portion.

3. The electronic device of claim 1, wherein
   the output device is a second antenna which has a greater communication distance than the first antenna, the second antenna configured to wirelessly transmit outside at least a part of the data received by the first antenna.

4. An electronic device comprising:
   a cover;
   a flexible board, at least a part of which is covered by the cover;
   an antenna on the flexible board, the antenna having flexibility;
   a communication module configured to perform close proximity wireless communication by using the antenna; and
   an output device configured to output at least a part of data received by the antenna, wherein
   the flexible board comprises a first portion corresponding to the output device, a second portion, and a third portion,
   the second and third portions are positioned separately at both ends of the first portion, and
   the second portion comprises the antenna.

5. The electronic device of claim 1, wherein
   the output device is a display.

* * * * *